United States Patent
Yamashita et al.

(10) Patent No.: US 10,797,341 B2
(45) Date of Patent: Oct. 6, 2020

(54) BATTERY MODULE, BATTERY PACK, VEHICLE, AND STATIONARY POWER SUPPLY

(71) Applicant: KABUSHIKI KAISHA TOSHIBA, Minato-ku (JP)

(72) Inventors: Yasunobu Yamashita, Tokyo (JP); Shinsuke Matsuno, Tokyo (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 147 days.

(21) Appl. No.: 16/122,248

(22) Filed: Sep. 5, 2018

(65) Prior Publication Data
US 2019/0288327 A1    Sep. 19, 2019

(30) Foreign Application Priority Data

Mar. 16, 2018  (JP) .................................. 2018-049536

(51) Int. Cl.
*H01M 10/0525*     (2010.01)
*H01M 4/485*       (2010.01)
(Continued)

(52) U.S. Cl.
CPC ....... *H01M 10/0525* (2013.01); *H01M 4/485* (2013.01); *H01M 10/0564* (2013.01);
(Continued)

(58) Field of Classification Search
CPC .... H01M 4/485; H01M 4/505; H01M 4/5825; H01M 10/0525; H01M 10/0564;
(Continued)

(56) References Cited

U.S. PATENT DOCUMENTS

2004/0053083 A1    3/2004   Kobayashi et al.
2007/0029124 A1*   2/2007   DasGupta ............. B60L 3/0046
                                                          429/218.1
(Continued)

FOREIGN PATENT DOCUMENTS

JP    2006-100244    4/2006
JP    2009-259473    11/2009
(Continued)

OTHER PUBLICATIONS

Liu, S. et al., "Rechargeable Aqueous Lithium-Ion Battery of Ti02/LiMn204 with a High Voltage", Journal of the Electrochemical Society, 158(12), 2011, pp. 8.
(Continued)

*Primary Examiner* — Gregg Cantelmo
(74) *Attorney, Agent, or Firm* — Oblon, McClelland, Maier & Neusadt, L.L.P.

(57) ABSTRACT

According to one embodiment, a battery module includes a battery unit. The battery unit includes a nonaqueous lithium ion battery including a nonaqueous electrolyte, and an aqueous lithium ion battery including an electrolytic solution in which an electrolyte is dissolved in an aqueous solvent. In the battery unit, the aqueous lithium ion battery is connected in parallel to the nonaqueous lithium ion battery.

20 Claims, 4 Drawing Sheets

(51) Int. Cl.
*H01M 10/36* (2010.01)
*H01M 10/42* (2006.01)
*H01M 10/0564* (2010.01)
*H01M 16/00* (2006.01)
*H01M 4/02* (2006.01)
*H01M 4/58* (2010.01)
*H01M 4/505* (2010.01)

(52) U.S. Cl.
CPC ......... *H01M 10/36* (2013.01); *H01M 10/425* (2013.01); *H01M 16/00* (2013.01); *H01M 4/505* (2013.01); *H01M 4/5825* (2013.01); *H01M 2004/027* (2013.01); *H01M 2010/4271* (2013.01); *H01M 2220/10* (2013.01); *H01M 2220/20* (2013.01); *H01M 2300/0002* (2013.01)

(58) Field of Classification Search
CPC .... H01M 10/36; H01M 10/425; H01M 16/00; H01M 2004/027; H01M 2010/4271; H01M 2220/10; H01M 2220/20; H01M 2300/0002
See application file for complete search history.

(56) References Cited

U.S. PATENT DOCUMENTS

| | | | | |
|---|---|---|---|---|
| 2008/0111508 | A1* | 5/2008 | Dasgupta | H02J 7/0013 318/139 |
| 2010/0136427 | A1* | 6/2010 | Kondo | H01M 4/485 429/207 |
| 2010/0207577 | A1 | 8/2010 | Sugiyama et al. | |
| 2010/0248078 | A1* | 9/2010 | Beard | H01G 9/038 429/501 |
| 2014/0184159 | A1* | 7/2014 | Kachi | B60L 58/13 320/109 |
| 2017/0271682 | A1 | 9/2017 | Matsuno et al. | |
| 2017/0271717 | A1 | 9/2017 | Yamashita et al. | |
| 2017/0373351 | A1* | 12/2017 | Kawai | H01M 10/36 |

FOREIGN PATENT DOCUMENTS

| | | | |
|---|---|---|---|
| JP | | 2013-120680 | 6/2013 |
| JP | | 2017-174809 | 9/2017 |
| JP | | 2017-174810 | 9/2017 |
| JP | | 6321287 | 5/2018 |
| WO | WO 2006/122395 A1 | | 11/2006 |
| WO | WO 2009/031255 A1 | | 3/2009 |
| WO | WO 2012/097457 A1 | | 7/2012 |
| WO | WO 2013/054795 A1 | | 4/2013 |
| WO | WO 2015/108111 A1 | | 7/2015 |
| WO | WO-2016114141 A1 * | 7/2016 | ............ H01M 10/36 |
| WO | WO 2017/086400 A1 | | 5/2017 |

OTHER PUBLICATIONS

Alias, N. et al. "Advances of aqueous rechargeable lithium-ion battery: A review" Journal of Power Sources, 2015, pp. 237-251.

* cited by examiner

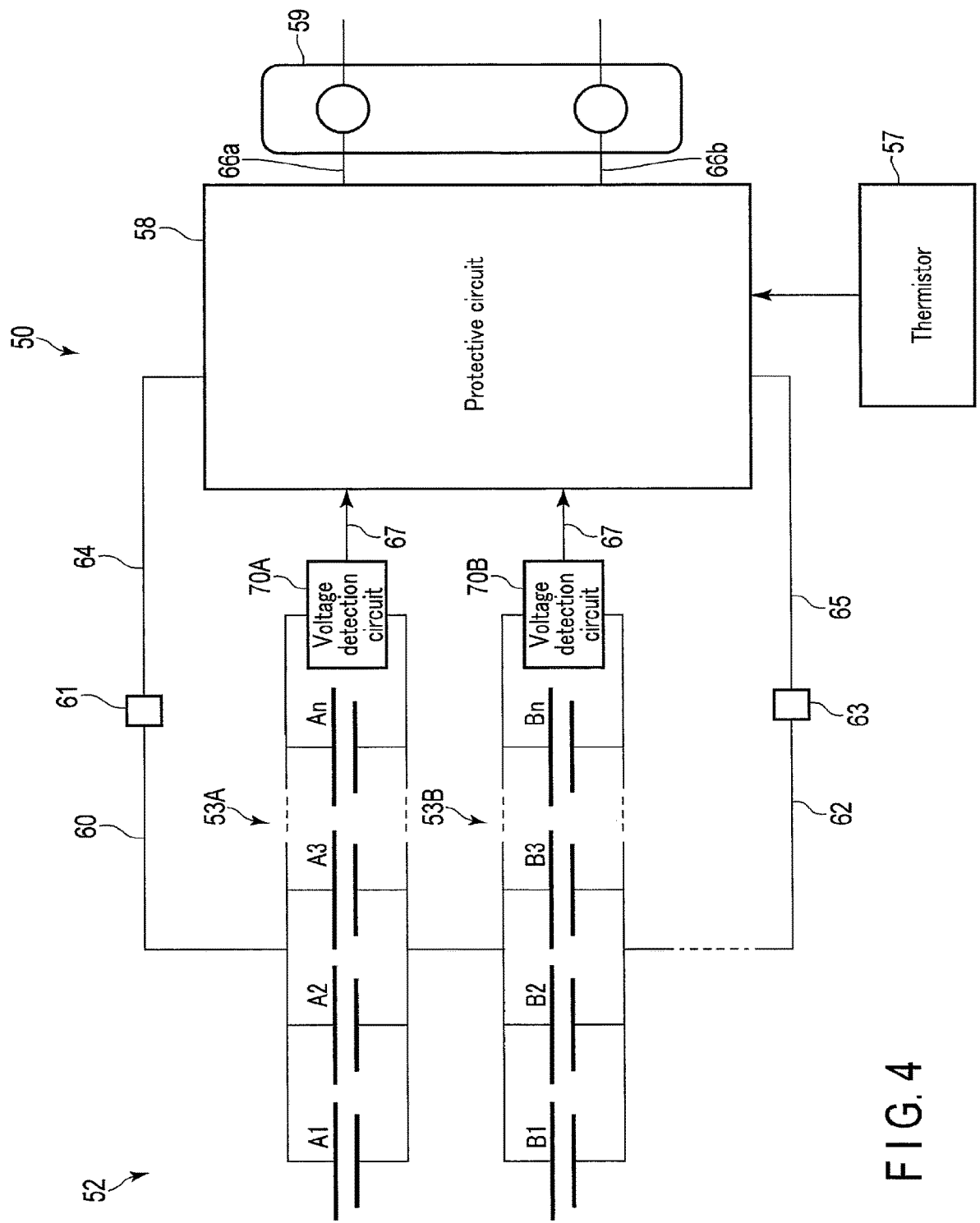
F I G. 4

BATTERY MODULE, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2018-049536, filed Mar. 16, 2018; the entire contents of which are incorporated herein by reference.

FIELD

Embodiments described herein relate to a battery module, a battery pack, a vehicle, and a stationary power supply.

BACKGROUND

Battery modules, each of which is formed from a plurality of nonaqueous lithium ion batteries (nonaqueous LIB), exist. In one example of such battery modules, for example, the plurality of nonaqueous LIBs are connected to each other. In another example of the battery modules, one battery unit is formed from a plurality of nonaqueous LIBs connected in parallel to each other, and a plurality of battery units are connected in series. Thus, in the battery module in which the nonaqueous LIBs or the battery units are connected in series, a variation may occur in state of charge (SOC) between the nonaqueous LIBs or between the battery units. The variation in SOC may cause the over-charge of some of the plurality of nonaqueous LIBs or fast deterioration in the capacity of the battery module. A protective circuit balances the capacity between the nonaqueous LIBs (battery units) in which SOCs are shifted from each other, or consumes a current in an external circuit to allow the variation in SOC to be suppressed. However, when the protective circuit suppresses the variation in SOC as described above, the complication of the protective circuit may cause high costs, or heat production when SOC is adjusted.

From the viewpoint of suppressing the over-charge of the nonaqueous LIB, a battery module, in which a nonaqueous LIB is connected in parallel to an aqueous lead storage battery or an aqueous Ni-MH battery. However, the non-aqueous LIB has a different operating electric potential from that of each of the aqueous lead storage battery and the aqueous Ni-MH battery. For this reason, the battery module as described above requires adjustment for the securement of voltage compatibility in a parallel section, such as the adjustment of the number of the nonaqueous LIBs and the number of the aqueous batteries in a parallel section of the nonaqueous LIBs and the aqueous batteries. The over-discharge of the aqueous lead storage battery may cause fast deterioration in the battery module, and a memory effect of the aqueous Ni-MH battery may cause fast deterioration in the battery module. This may shorten the life of the battery module. The aqueous lead storage battery and the aqueous Ni-MH battery have a low operating electric potential, whereby an energy density may be decreased by using the aqueous lead storage battery or the aqueous Ni-MH battery.

BRIEF DESCRIPTION OF THE DRAWINGS

FIG. 4 is a schematic diagram showing the circuit configuration of the battery pack of FIG. 3;

DETAILED DESCRIPTION

According to one embodiment, a battery module includes a battery unit. The battery unit includes a nonaqueous lithium ion battery including a nonaqueous electrolyte, and an aqueous lithium ion battery including an electrolytic solution in which an electrolyte is dissolved in an aqueous solvent. In the battery unit, the aqueous lithium ion battery is connected in parallel to the nonaqueous lithium ion battery.

According to the embodiment, a battery pack is provided. The battery pack includes the above-described battery module.

According to the embodiment, a vehicle is provided. The vehicle includes the above-described battery pack.

According to the embodiment, a stationary power supply is provided. The stationary power supply includes the above-described battery pack.

Hereinafter, embodiments will be described with reference to the drawings.

[First Embodiment]

In the present embodiment, a battery module, which is formed from a plurality of lithium ion batteries (lithium ion secondary batteries), is provided. A battery pack, which includes the battery module, is provided. In the present embodiment, both a nonaqueous lithium ion battery (nonaqueous LIB) and an aqueous lithium ion battery (aqueous LIB) are used as a unit cell forming the battery module.

(Lithium Ion Battery (Unit Cell))

Figure 1:
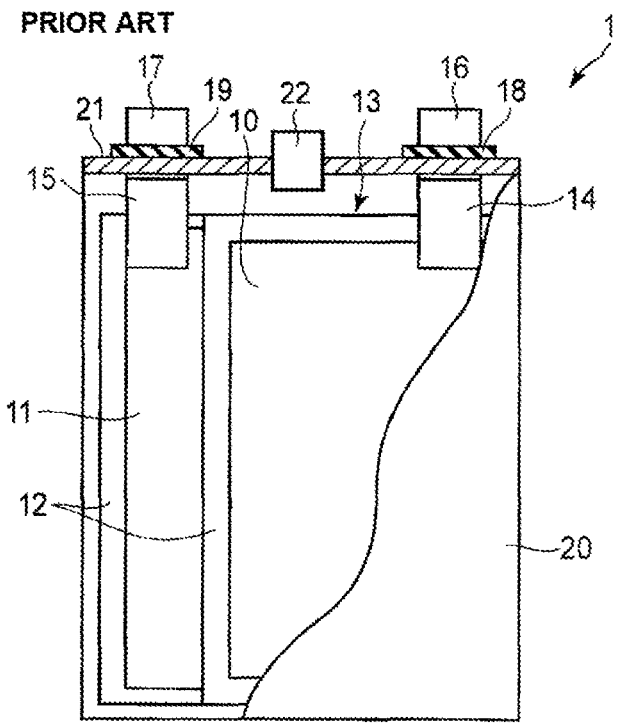
FIG. 1 is a schematic diagram showing an example of the configuration of a lithium ion battery according to a first embodiment.
Figure 2:
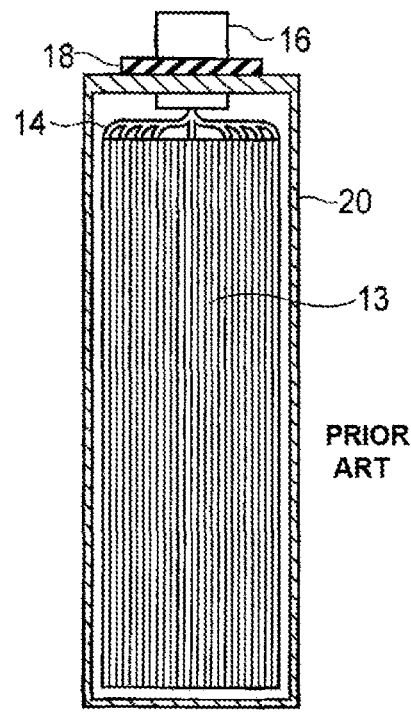
FIG. 2 is a schematic diagram showing the cross section of the lithium ion battery of FIG. 1 perpendicular or substantially perpendicular to FIG. 1.

The nonaqueous lithium ion battery and the aqueous lithium ion battery forming the battery module according to the present embodiment will be described. FIGS. 1 and 2 show an example of the configuration of a lithium ion battery 1. One example of FIGS. 1 and 2 is the lithium ion battery 1 using a rectangular metallic container 20 as a container member. The configuration of FIGS. 1 and 2 can be applied to both the nonaqueous LIB and the aqueous LIB. FIGS. 1 and 2 schematically show the cross section of the lithium ion battery (LIB) 1. The cross section of FIG. 1 and the cross section of FIG. 2 are perpendicular or substantially perpendicular to each other.

As shown in FIGS. 1 and 2, the lithium ion battery 1 includes an electrode group 13. The electrode group 13 is stored in a rectangular cylindrical metallic container (container member) 20. The electrode group 13 includes, for example, a positive electrode 10, a negative electrode 11, and a separator 12. In certain Example, the electrode group 13 has a structure in which the positive electrode 10, the separator 12, the negative electrode 11, and the separator are stacked in this order. In another Example, the electrode group 13 has a structure in which the positive electrode 10 and the negative electrode 11 are spirally wound with the separator 12 interposed between the positive electrode 10 and the negative electrode 11, and the electrode group 13 is formed in a flat shape, for example. Even when the electrode group 13 has any of the above-described structures, the positive electrode 10 and the negative electrode 11 are electrically insulated from each other by the separator 12. Even when the electrode group 13 has any of the above-described structures, the separator 12 is desirably disposed on the outermost layer of the electrode group 13. This prevents contact between the electrode (positive electrode 10 and negative electrode 11) and the metallic container 20. The electrode group 13 holds an electrolytic solution (not shown).

In one example of FIGS. 1 and 2, in the vicinity of one end face of the electrode group 13, a plurality of positive electrode leads 14 are electrically connected to an end part of the positive electrode 10, and a plurality of negative electrode leads 15 are electrically connected to an end part of the negative electrode 11. Each of the plurality of positive electrode leads 14 has, for example, a strip shape, and the positive electrode leads 14 are connected to the end part of the positive electrode 10 at different positions with respect to each other. Similarly, each of the plurality of negative electrode leads 15 has, for example, a strip shape, and the negative electrode leads 15 are connected to the end part of the negative electrode 11 at different positions with respect to each other. The plurality of positive electrode leads 14 are electrically connected to a positive electrode conductive tab 16 in a state where the positive electrode leads 14 are bundled. The positive electrode lead 14 (positive electrode internal terminal) and the positive electrode conductive tab 16 (positive electrode external terminal) constitute a positive electrode terminal (electrode terminal). The negative electrode leads 15 are electrically connected to a negative electrode conductive tab 17 in a state where the negative electrode leads 15 are bundled. The negative electrode lead 15 (negative electrode internal terminal) and the negative electrode conductive tab 17 (negative external terminal) constitute a negative electrode terminal (electrode terminal).

A metal sealing plate 21 is fixed to an opening part of the metallic container 20 by welding or the like. Two drawing holes are formed in the sealing plate 21. Each of the positive electrode conductive tab 16 and the negative electrode conductive tab 17 protrudes from the corresponding one of the drawing holes to the outside of the metallic container 20. In the sealing plate 21, each of a positive electrode gasket 18 and a negative electrode gasket 19 is disposed on the inner circumferential surface of corresponding one of the drawing holes. This prevents the contact of the positive electrode conductive tab 16 and the negative electrode conductive tab 17 with the sealing plate 21, to avoid a short circuit. By disposing the positive electrode gasket 18 and the negative electrode gasket 19, the airtightness of the rectangular lithium ion battery (lithium secondary battery) 1 can be maintained.

A control valve (safety valve) 22 is disposed on the sealing plate 21. In the aqueous LIB, a gas generated by the electrolysis of the aqueous solvent may cause an increased internal pressure of the metallic container 20 in which the electrode group 13 is disposed. In this case, the generated gas can be dissipated to the outside of the metallic container 20 via the control valve 22. In certain Example, a return type control valve is used as the control valve 22. This control valve is operated, for example, when the internal pressure is higher than a set value, and functions as a sealing plug when the internal pressure is decreased. In another Example, a non-return type control valve is used. In this case, once the control valve is operated, the function as the sealing plug does not recover. In one example of FIGS. 1 and 2, the control valve 22 is disposed at the center of the sealing plate 21, but the position of the control valve 22 may be the end part of the sealing plate 21. The control valve 22 may not be provided.

Hereinafter, the negative electrode, the positive electrode, the electrolytic solution, the electrode terminal, the separator, the gasket, and the container member or the like, that is, the constituent elements of the lithium ion battery will be described in detail.

<Negative Electrode>

Regarding the negative electrode, the following constitution can be applied to both the nonaqueous LIB and the aqueous LIB. The negative electrode includes a negative electrode current collector and a negative electrode mixture layer disposed on the negative electrode current collector. The negative electrode mixture layer contains a negative electrode active material.

The negative electrode current collector is a metal body, and the metal body contains at least one metal selected from the group consisting of aluminum, copper, zinc, nickel, titanium, and stainless steel. The metal body can contain one metal of the above-described metals. The metal body can contain two or more metals of the above-described metals. In certain Example, the metal body is, for example, a metal foil made of one of the above-described metals. In another Example, the metal body is an alloy foil containing, for example, two or more of the above-described metals. Examples of the shape of the metal body include a mesh shape and a porous body shape, besides the foil. From the viewpoint of improving an energy density and output, it is desirable that the metal body is a foil shape, which has a small volume and has a large surface area. The surface of the negative electrode current collector may be coated with a carbon-containing layer. In this case, the negative electrode mixture layer is disposed on the carbon-containing layer.

The negative electrode active material contains a titanium-containing oxide. Examples of the titanium-containing oxide include a titanium oxide, a lithium titanium oxide, a niobium titanium oxide, and a sodium niobium titanium oxide. The Li insertion potential of the titanium-containing oxide is desirably 1 V (vs. Li/Li$^+$) or more and 3 V (vs. Li/Li$^+$) or less. Here, when the Li insertion potential of the titanium-containing oxide is lower than 1 V, a side reaction between the negative electrode active material and the electrolytic solution may occur. On the other hand, when the Li insertion potential is more than 3 V, the battery voltage is decreased. The negative electrode active material may contain one or two more of the above-described titanium-containing oxides.

Examples of the titanium oxide include a titanium oxide having a monoclinic structure, a titanium oxide having a rutile structure, and a titanium oxide having an anatase structure. The titanium oxide having each crystal structure can be represented by TiO$_2$ as an uncharged composition and Li$_x$TiO$_2$ (x: 0≤x≤1) as a charged composition. The uncharged structure of the titanium oxide having a monoclinic structure can be represented as TiO$_2$(B).

Examples of the lithium titanium oxide include a lithium titanium oxide having a spinel structure (for example, the general formula: Li$_{4+x}$Ti$_5$O$_{12}$ (−1≤x≤3)), a lithium titanium oxide having a ramsdellite structure (for example, Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0<x≤1). Examples of the lithium titanium oxide include a lithium titanium composite oxide in which a dopant is introduced into the above-described lithium titanium oxide having a spinel structure or a ramsdellite structure.

Examples of the niobium titanium oxide include one represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

Examples of the sodium niobium titanium oxide include an orthorhombic Na-containing niobium titanium composite oxide represented by the general formula $Li_{2+v}Na_{2-w}M1_x Ti_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $y+z < 6$, $-0.5 \leq \delta \leq 0.5$; M1 contains at least one selected from group consisting of Cs, K, Sr, Ba, and Ca; and M2 contains at least one selected from group consisting of Zr, Sn, V, Ta, Mo, W, Fe, Co, Mn, and Al).

The negative electrode active material is contained, for example, in the form of particles in the negative electrode. Negative electrode active material particles may be independent primary particles, secondary particles as agglomerates of primary particles, or a mixture of the independent primary particles and the secondary particles. The shape of the particles is not particularly limited, and may be, for example, a spherical shape, an elliptical shape, a flat shape, and a fibrous shape or the like. The diameter of the secondary particles of the active material is preferably 500 nm or more and 50 µm or less. When the diameter of the secondary particles is less than 500 nm, agglomeration or the like may affect the coatability of the active material. When the diameter of the secondary particles is more than 50 µm, a Li diffusion distance in the active material is increased, which may make it difficult to obtain sufficient reactivity.

The negative electrode mixture layer can be disposed on one surface or each of both surfaces of the negative electrode current collector. In addition to the above-described negative electrode active material, the negative electrode mixture layer may further contain a conductive agent and a binder.

Examples of the conductive agent include carbonaceous materials such as acetylene black, carbon black, graphite, carbon nanofibers, and carbon nanotubes. As the conductive agent, one of the above-described carbonaceous materials may be used alone, or a plurality of carbonaceous materials of the above-described carbonaceous materials may be used.

The binder binds the active material, the conductive agent, and the current collector. Examples of the binder include polytetrafluoroethylene (PTFE), polyvinylidene fluoride (PVdF), fluorocarbon rubber, acrylic resin, and cellulose. Examples of cellulose used for the binder include carboxymethyl cellulose.

The proportions of the negative electrode active material, conductive agent, and binder in the negative electrode mixture layer are preferably as follows: the negative electrode active material: 30% by weight or more and 96% by weight or less, the conductive agent: 2% by weight or more and 60% by weight or less, and the binder: 2% by weight or more and 30% by weight or less. When the amount of the conductive agent is less than 2% by weight, the current collecting performance of the negative electrode mixture layer is deteriorated, which may cause deterioration in the large current performance of the battery. When the amount of the binder is less than 2% by weight, the binding property of the negative electrode mixture layer and the negative electrode current collector is deteriorated, may cause deterioration in cycle performance. On the other hand, from the viewpoint of an increase in a capacity, the amount of the conductive agent is preferably 60% by weight or less, and the amount of the binder is preferably 30% by weight or less.

The negative electrode can be produced, for example, by the following method. First, the negative electrode active material, the conductive agent, and the binder are suspended in a solvent, to prepare a slurry. Then, the prepared slurry is applied to one or each of both of surfaces of the negative electrode current collector. By drying the coating film on the negative electrode current collector, the negative electrode mixture layer is formed. Thereafter, the negative electrode current collector and the negative electrode mixture layer formed on the negative electrode current collector are pressed. In place of pressing, the negative electrode active material, the conductive agent, and the binder may be formed in a pellet form, and used as the negative electrode mixture layer.

<Positive Electrode>

Regarding the positive electrode, the following constitution can be applied to both the nonaqueous LIB and the aqueous LIB. The positive electrode includes a positive electrode current collector and a positive electrode mixture layer disposed on the positive electrode current collector. The positive electrode mixture layer can be formed on one or each of both of surfaces of the positive electrode current collector. The positive electrode mixture layer contains a positive electrode active material. The positive electrode mixture layer can further contain a conductive agent and a binder. The positive electrode current collector is a metal body containing the same metal as the metal forming the negative electrode current collector. The positive electrode current collector is formed in the same shape as that of the negative electrode current collector, for example, in a metal foil shape.

As the positive electrode active material, for example, a compound capable of inserting and extracting lithium can be used. The positive electrode active material contains at least one selected from the group consisting of a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, lithium fluorinated sulfate iron, and a phosphate compound having an olivine crystal structure (for example, $Li_xFePO_4$ ($0 \leq x \leq 1$), and $Li_xMnPO_4$ ($0 \leq x \leq 1$)). The phosphate compound having an olivine crystal structure has excellent thermal stability.

Examples of the positive electrode active material providing a high positive electrode electric potential are as follows. That is, examples thereof include lithium manganese composite oxides such as $Li_xMn_2O_4$ ($0 < x \leq 1$) and $Li_xMnO_2$ ($0 < x \leq 1$), lithium nickel aluminum composite oxides such as $Li_xNi_{1-y}Al_yO_2$ ($0 < x \leq 1$, $0 < y \leq 1$), lithium cobalt composite oxides such as $Li_xCoO_2$ ($0 < x \leq 1$), lithium nickel cobalt composite oxides such as $Li_xNi_{1-y-z}Co_yMn_zO_2$ ($0 < x \leq 1$, $0 < y \leq 1$, $0 \leq z \leq 1$), lithium manganese cobalt composite oxides such as $Li_xMn_yCo_{1-y}O_2$ ($0 < x \leq 1$, $0 < y \leq 1$), spinel type lithium manganese nickel composite oxides such as $Li_xMn_{2-y}Ni_yO_4$ ($0 < x \leq 1$, $0 < y < 2$), lithium phosphorus oxides having an olivine structure such as $Li_xFePO_4$ ($0 < x \leq 1$), $Li_xFe_{1-y}Mn_yPO_4$ ($0 < x \leq 1$, $0 \leq y \leq 1$), and $Li_xCoPO_4$ ($0 < x \leq 1$), and fluorinated sulfate iron (for example, $Li_xFeSO_4F$ ($0 < x \leq 1$)).

As the positive electrode active material, one of the above-described active materials may be used alone, or two or more of the above-described active materials may be used. Among the above-described active materials, the positive electrode active material preferably contains at least one compound selected from the group consisting of $LiFePO_4$, $LiMn_2O_4$, and $LiCoO_2$. In this case, the operating electric potential of the lithium ion battery is not excessively high, whereby the oxidative decomposition of the aqueous solvent can be suppressed.

The positive electrode mixture layer can contain the same conductive agent as the conductive agent contained in the negative electrode mixture layer. In this case, examples of the conductive agent include carbonaceous materials such as acetylene black, carbon black, graphite, carbon nanofibers, and carbon nanotubes. As the conductive agent of the positive electrode mixture layer, one of the above-described carbonaceous materials may be used alone, or a plurality of carbonaceous materials of the above-described carbonaceous materials may be used.

As with the binder of the negative electrode mixture layer, the binder binds the active material, the conductive agent, and the current collector in the positive electrode mixture layer. The positive electrode mixture layer can contain the same binder as the binder contained in the negative electrode mixture layer. In this case, examples of the binder include polytetrafluoroethylene (PTFE), polyvinylidene fluoride (PVdF), fluorocarbon rubber, acrylic resin, and cellulose, and examples of cellulose used for the binder include carboxymethyl cellulose.

The proportions of the positive electrode active material, conductive agent, and binder in the positive electrode mixture layer are preferably as follows: the positive electrode active material: 30% by weight or more and 95% by weight or less, the conductive agent: 3% by weight or more and 18% by weight or less, and the binder: 2% by weight or more and 30% by weight or less. By setting the proportion of the conductive agent to 3% by weight or more, the conductivity of the positive electrode can be secured. By setting the proportion of the conductive agent to 18% by weight or less, the decomposition of the electrolytic solution on the surface of the conductive agent in high-temperature storage can be reduced. By setting the proportion of the binder to 2% by weight or more, sufficient electrode strength is obtained. By setting the proportion of the binder to 30% by weight or less, the blending amount of the binder serving as the insulating material in the positive electrode is decreased, whereby the internal resistance can be reduced.

<Electrolytic Solution>

First, the electrolytic solution of the nonaqueous LIB, or the like will be described. In the nonaqueous LIB, a nonaqueous electrolytic solution can be used as the electrolytic solution. The nonaqueous electrolytic solution which is the nonaqueous electrolyte is prepared by dissolving an electrolyte in an organic solvent. In the nonaqueous electrolytic solution, the concentration of the electrolyte is preferably 0.5 mol/L to 2.5 mol/L.

Examples of the electrolyte to be dissolved in the organic solvent include lithium salts such as lithium perchlorate ($LiClO_4$), lithium hexafluorophosphate ($LiPF_6$), lithium tetrafluoroborate ($LiBF_4$), lithium hexafluoroarsenide (Li-$AsF_6$), lithium trifluoromethanesulfonate ($LiCF_3SO_3$) and lithium bistrifluoromethylsulfonylimide [$LiN(CF_3SO_2)_2$], and mixtures thereof. The electrolyte is preferably resistant to oxidation even at a high electric potential, and $LiPF_6$ is most preferably used as the electrolyte.

Examples of the organic solvent in which the electrolyte is dissolved include cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); chain ethers such as dimethoxy ethane (DME) and diethoxy ethane (DEE); γ-butyrolactone (GBL), acetonitrile (AN), and sulfolane (SL). These organic solvents can be used alone or as a mixed solvent.

In the nonaqueous LIB, a gel nonaqueous electrolyte can be used in place of the nonaqueous electrolytic solution. The gel nonaqueous electrolyte is prepared by combining the above-described nonaqueous electrolytic solution with a polymeric material. Examples of the polymeric material to be combined with the nonaqueous electrolytic solution include polyvinylidene fluoride (PVdF), polyacrylonitrile (PAN) and polyethylene oxide (PEO), and mixtures thereof.

As the nonaqueous electrolyte, a room-temperature molten salt (ionic melt) containing lithium ions, or a solid electrolyte may be used in place of the nonaqueous electrolytic solution and the gel nonaqueous electrolyte. Examples of the solid electrolyte include a polymer solid electrolyte and an inorganic solid electrolyte.

The room-temperature molten salt (ionic melt) means a compound which is an organic salt containing an organic cation and an organic anion, and can exist as a liquid by itself at normal temperature (15 to 25° C.). The room-temperature molten salt includes a room-temperature molten salt which exists alone as a liquid, a room-temperature molten salt which becomes a liquid after being mixed with an electrolyte, a room-temperature molten salt which becomes a liquid after being dissolved in an organic solvent, and mixtures thereof. In general, the melting point of the room-temperature molten salt used as the nonaqueous electrolyte in nonaqueous electrolyte batteries is 25° C. or lower. The organic cation which is the composition of the room-temperature molten salt generally has a quaternary ammonium skeleton.

The polymer solid electrolyte is prepared by dissolving an electrolyte in a polymeric material, and solidifying it. The inorganic solid electrolyte is a solid substance having Li ion conductivity.

Next, the electrolytic solution of the aqueous LIB will be described. The electrolytic solution of the aqueous LIB contains an aqueous solvent and an electrolyte. The electrolytic solution contains at least one anion selected from the group consisting of $NO_3^-$, $Cl^-$, $LiSO_4^-$, $SO_4^{2-}$, and $OH^-$. The electrolytic solution may contain one of the above-described anions, or may contain two or more of the above-described anions.

As the aqueous solvent, a solution containing water can be used. Here, the solution containing water may be pure water, or may be a mixed solution or solvent of water and a substance other than water.

In the electrolytic solution, for example, the amount of a water solvent such as the amount of water in the aqueous solvent is preferably 6 times or less in terms of a molar ratio with respect to a salt as a solute. The amount of the water solvent is more preferably 4 times or less in terms of a molar ratio with respect to the solute. The above-described configuration makes it possible to suppress the decomposition of the water solvent at the interface of the electrode.

It is necessary to dissolve the electrolyte in the aqueous solvent and dissociate it to generate the above-described anions. For this reason, a lithium salt which dissociates into Li ions and the above-described anions is preferably used for the electrolyte. Examples of the lithium salt include $LiNO_3$, LiCl, $Li_2SO_4$, and LiOH.

The lithium salt which dissociates into Li ions and anions has a relatively high solubility in the aqueous solvent. For this reason, it is possible to obtain an electrolytic solution having a high anion concentration of 1 to 10 M and good Li ion diffusibility.

An electrolytic solution containing at least one of $NO_3^-$ and $Cl^-$ can be used in a wide range of an anion concentration of about 0.1 to 10 M. However, from the viewpoint of ionic conductivity, it is preferable that the concentration of anions in the electrolytic solution containing at least one of $NO_3^-$ and $Cl^-$ is as high as 3 to 9 M. In the electrolytic solution containing one of $NO_3^-$ and $Cl^-$, the anion concentration is more preferably 8 to 9 M.

The electrolytic solution containing at least one of $LiSO_4^-$ and $SO_4^{2-}$ can be used in an anion concentration range of about 0.05 to 2.5 M. However, from the viewpoint of ionic conductivity, it is preferable that the concentration of anions in the electrolytic solution containing at least one of $LiSO_4^-$ and $SO_4^{2-}$ is as high as 1.5 to 2.5 M.

An $OH^-$ concentration in the electrolytic solution is desirably $10^{-10}$ to 0.1 M. The electrolytic solution can contain both lithium ions and sodium ions.

The pH of the electrolytic solution is desirably 4 or more and 13 or less. When the pH is less than 4, the electrolytic solution is acidic, whereby the decomposition of the active material is apt to proceed. On the other hand, when the pH exceeds 13, over-voltage during the generation of oxygen in the positive electrode is decreased, whereby the electrolysis of the aqueous solvent is apt to proceed.

<Electrode Terminal>

Regarding the electrode terminal, the following configuration can be applied to both the nonaqueous LIB and the aqueous LIB. The electrode terminal can include, for example, an external terminal and an internal terminal. In certain Example, the external terminal is, for example, a conductive tab of an electrode (positive electrode and negative electrode). In another Example, as will be described later, a container member having conductivity such as a metal can be provided in a LIB, and an external terminal can also be formed in a container member. The internal terminal includes, for example, an electrode lead. The shape of the internal terminal is not particularly limited, and the internal terminal is formed in, for example, a strip shape, a disc shape, a washer shape, a spiral shape, or a corrugated plate shape or the like.

The electrode terminal is preferably formed of at least one metal selected from the group consisting of aluminum, zinc, titanium and iron, or an alloy of these metals. Examples of the alloy include an aluminum alloy and stainless steel. The internal terminal is desirably made of a metal capable of suppressing the electrolysis of the aqueous solvent of the aqueous LIB. For example, the positive electrode internal terminal is preferably made of titanium, and the negative electrode internal terminal is preferably made of zinc.

The internal terminal may be in contact with the electrolytic solution in the lithium ion battery. For this reason, the surface of the internal terminal is desirably protected by an insulating resin or the like. This makes it possible to suppress the electrolysis of the aqueous solvent of the aqueous LIB. Polymeric materials such as polypropylene (PP), polyethylene (PE), nylon, and polyethylene terephthalate (PET) can be used as the insulating resin for protecting the surface of the internal terminal.

A lithium ion battery included in a battery module is electrically connected to an external circuit outside the battery module, for example, via an electrode terminal. By connecting the external circuit to the electrode terminal, a current can be supplied from the battery module to the external circuit. In the battery module, the electrode terminal of a certain lithium ion battery is electrically connected to the electrode terminal of another lithium ion battery. Thereby, for example, a plurality of lithium ion batteries (unit cells) are connected in series or in parallel.

<Separator>

In both the nonaqueous LIB and the aqueous LIB, a porous film and a nonwoven fabric or the like which are made of a synthetic resin can be used as a separator. In this case, examples of the material forming the porous film and the nonwoven fabric include polyethylene (PE), polypropylene (PP), cellulose, glass fiber, and polyvinylidene fluoride (PVdF). Among the above-described materials, cellulose has excellent Li diffusibility or the like. For this reason, cellulose is preferably used as the material forming the separator.

In the nonaqueous LIB, as described above, the solid electrolyte can be used as the nonaqueous electrolyte. In this case, the solid electrolyte may be used as the separator, and the positive electrode and the negative electrode may be electrically insulated from each other by the solid electrolyte. The solid electrolyte used as the separator is preferably an oxide such as LATP having a NASICON type skeleton ($Li_{1+x}Al_xTi_{2-x}(PO_4)_3$; $0.1 \leq x \leq 0.4$), amorphous LIPON ($Li_{2.9}PO_{3.3}N_{0.46}$) or garnet type LLZ ($Li_7La_3Zr_2O_{12}$).

<Gasket>

Regarding the gasket, the following configuration can be applied to both the nonaqueous LIB and the aqueous LIB. As the gasket, for example, polymeric materials such as polypropylene (PP), polyethylene (PE), nylon, and polyethylene terephthalate (PET) can be used. The use pf the polymeric material as the gasket makes it possible to improve the internal airtightness of the lithium ion battery and to prevent a short circuit between the positive electrode and the negative electrode.

<Container Member>

Regarding the container member, the following constitution can be applied to both the nonaqueous LIB and the aqueous LIB. As the container member, either a bag-shaped container made of a laminated film or a metallic container can be used. Examples of the shape of the container member include a flat shape, a rectangular shape, a cylindrical shape, a coin shape, a button shape, a sheet shape, and a stack shape. Needless to say, a suitable container member can be used according to the application of the battery module including a plurality of lithium ion batteries. For example, when the battery module is mounted on a portable electronic device or the like, a container member for a small battery can be used. When the battery module is mounted on a vehicle such as a two-wheeled vehicle or a four-wheeled automobile, a container member for a large-sized battery can be used.

As the laminated film, for example, a multilayer film can be used, and the multilayer film can include a plurality of resin layers and a metal layer disposed between the resin layers. In this case, from the viewpoint of a weight reduction, the metal layer is preferably an aluminum foil or an aluminum alloy foil. As the resin layer, for example, a polymeric material such as polypropylene (PP), polyethylene (PE), nylon, or polyethylene terephthalate (PET) can be used. For example, the laminated film is heat-sealed to be formed into the shape of a container member. The thickness of the laminated film is preferably 0.5 mm or less, and more preferably 0.2 mm or less.

The metallic container is preferably made of at least one metal selected from the group consisting of aluminum, zinc, titanium, and iron, or an alloy of these metals. Specifically, examples of the alloy include an aluminum alloy and stainless steel. The metallic container has a thickness of, preferably 0.5 mm or less, and more preferably 0.2 mm or less.

When the metallic container is used as the container member, an electrode terminal (external terminal) can also be formed in the metallic container.

<Function and Effects>

In the lithium ion battery formed as described above, both the aqueous LIB and the nonaqueous LIB have a high operating electric potential (battery voltage). For this reason, a lithium ion battery (lithium ion secondary battery) can be provided, which has a high energy density. The aqueous LIB is highly safe since the aqueous LIB uses the electrolytic solution containing the aqueous solvent.

(Battery Module and Battery Pack)

Next, a battery module including a plurality of lithium ion batteries (unit cells) formed as described above, and a battery pack including the battery module will be described. The battery module according to the present embodiment includes one or more battery units. In each of the battery units, a plurality of lithium ion batteries (unit cells) are electrically connected in parallel to each other. The battery module is formed from one battery unit, or by connecting a plurality of battery units in series. In the present embodiment, each of the battery units includes both a nonaqueous lithium ion battery and an aqueous lithium ion battery. In each of the battery units, the nonaqueous LIB and the aqueous LIB are electrically connected in parallel to each other.

The nonaqueous LIB and the aqueous LIB are formed as described above. For this reason, a material contained in a positive electrode active material in the nonaqueous LIB is the same as that in the aqueous LIB, and a material contained in the negative electrode active material in a nonaqueous LIB is the same as that in the aqueous LIB.

In the battery pack, the battery module may be stored in a casing. As the casing, a metal can formed from any one of an aluminum alloy, iron, and stainless steel or the like, and a plastic container, or the like are used. The thickness of the container is desirably set to 0.5 mm or more.

In the battery module of the present embodiment, as described above, each of the plurality of lithium ion batteries (unit cells) is electrically connected to another lithium ion battery. In certain Example, each of the plurality of lithium ion batteries includes a container. In the container or the like of each of the lithium ion batteries, a positive electrode terminal and a negative electrode terminal are provided as electrode terminals. Each of the electrode terminals is connected to a corresponding electrode terminal of another lithium ion battery via a metal bus bar, for example. Thereby, the plurality of lithium ion batteries are electrically connected. Here, examples of the metal forming the bus bar include aluminum, nickel, and copper.

In another Example, electrode groups of a plurality of lithium ion batteries are stored in a common housing. In this case, in the production of the battery module, a plurality of electrode groups are disposed in one housing in a state where the electrode groups are electrically insulated from each other by, for example, a partition wall. Each of the insulated electrode groups is electrically connected to the corresponding other electrode group. Thereby, the plurality of lithium ion batteries are electrically connected.

The battery pack of the present embodiment may further include a protective circuit. The protective circuit controls the charge and discharge of the battery module, and controls the charge and discharge of each of the lithium ion batteries. In certain Example, a circuit formed in an apparatus using the battery module as an electric power supply may be used as a protective circuit. Examples of the apparatus using the battery module as an electric power supply, that is, an apparatus on which a battery pack is mounted include an electronic device and an automobile.

The battery module of the present embodiment may further include an energizing external terminal. The external terminal is connected to an external device of the battery module, that is, an external device of the battery pack. The external terminal is used to output a current from the battery module to the outside and/or to input a current to the battery module. That is, when the battery module is used as the electric power source, a current is supplied to the outside of the battery pack through the energizing external terminal. When the battery module is charged, a charge current is supplied to the battery module through the energizing external terminal. Examples of the charge current of the battery module include a regenerative energy due to the mechanical power of an automobile or the like.

Figure 3:
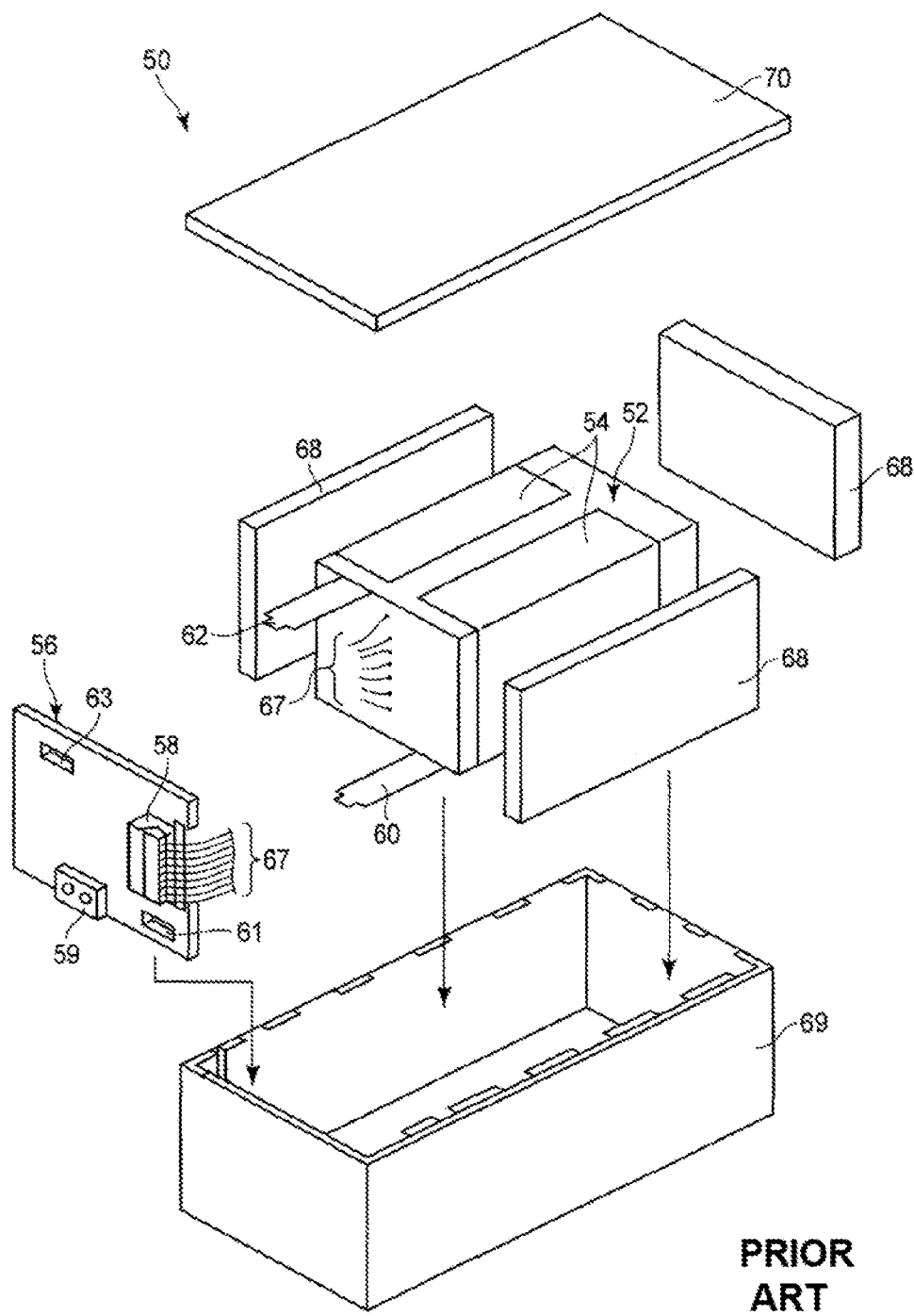
FIG. 3 is a perspective view schematically showing parts obtained by disassembling one example of a battery pack according to a first embodiment.

One example of a battery module 52 and a battery pack 50 in the present embodiment will be described with reference to FIGS. 3 and 4. FIG. 3 is an exploded perspective view of the battery pack 50 of the present embodiment. FIG. 4 is a diagram showing the circuit configuration of the battery pack 50 in FIG. 3.

In one example of FIGS. 3 and 4, in the battery module 52, a plurality of lithium ion batteries (A1 to An, B1 to Bn or the like) are stacked. In the battery module 52, the stacked lithium ion batteries are fastened with an adhesive tape 54 or the like. In the battery module 52, each of the lithium ion batteries is electrically connected to the corresponding other lithium ion battery via the above-described electrode terminals (positive electrode terminal and negative electrode terminal). Thereby, in the battery module 52, a plurality of battery units (53A, 53B or the like) are connected in series, and a plurality of lithium ion batteries (unit cells) are connected in parallel in each of the battery units.

In the battery pack 50, a printed wiring board 56 is disposed to face the battery module 52. In certain Example, each of the plurality of lithium ion batteries of the battery module 52 is disposed with the above-described electrode terminal facing the printed wiring board 56. A thermistor 57, a protective circuit 58, and an energizing external terminal 59 are mounted on the printed wiring board 56. An insulating plate (not shown) is preferably attached to the surface of the printed wiring board 56 which faces the battery module 52. This prevents unnecessary connection between an electric path on the printed wiring board 56 and the wiring of the battery module 52.

In the battery pack 50, a positive electrode lead 60 and a negative electrode lead 62 are connected to the battery module 52. In certain Example, one end of the positive electrode lead 60 is connected to the positive electrode terminal of the lithium ion battery located at the lowermost layer in the battery module 52. The other end of the positive electrode lead 60 is electrically connected to a positive electrode connector 61 of the printed wiring board 56. One end of the negative electrode lead 62 is connected to the negative electrode terminal of the lithium ion battery located at the uppermost layer in the battery module 52. The other end of the negative electrode lead 62 is electrically connected to a negative electrode connector 63 of the printed wiring board 56. The positive electrode connector 61 is connected to the protective circuit 58 via a wiring 64 formed on the printed wiring board 56, and the negative electrode connector 63 is connected to the protective circuit 58 via a wiring 65 formed on the printed wiring board 56.

In the battery module 52 of the battery pack 50, a protective sheet 68 is disposed on each of three side surfaces excluding a side surface facing the printed wiring board 56.

The protective sheet 68 is formed of rubber or resin. The battery module 52 is stored in a housing container 69 together with the protective sheet 68 and the printed wiring board 56. For this reason, in the housing container 69, the protective sheet 68 is disposed on each of inner side surfaces along a long side direction and the protective sheet 68 is disposed on one of inner side surfaces along a short side direction. In the housing container 69, the printed wiring board 56 is disposed on the inner surface along the short side direction opposite to the inner surface on which the protective sheet 68 is disposed. The battery module 52 is located in a space surrounded by the protective sheets 68 and the printed wiring board 56. A lid 70 is attached to the upper surface of the housing container 69.

In order to fix the battery module 52, a heat shrinkable tape may be used in place of the adhesive tape 54. In this case, the protective sheet 68 is disposed on each of both side surfaces along the long side direction of the battery module 52, and the heat shrinkable tape is caused to circle around the battery module 52. The heat shrinkable tape is thermally shrunk to bind the battery module 52.

The thermistor 57 detects the temperature of each of the plurality of lithium ion batteries (unit cells) of the battery module 52. The thermistor 57 outputs a detection signal of the temperature to the protective circuit 58.

The number of voltage detection circuits (70A, 70B or the like) provided in the battery module 52 is the same as that in the battery units (53A, 53B or the like). Each of the voltage detection circuits (70A, 70B or the like) detects voltage in corresponding one unit of the battery units. The voltage detection circuits (70A, 70B or the like) are connected to the protective circuit 58 via a wiring 67. Each of the voltage detection circuits (70A, 70B or the like) outputs a detection signal of voltage to the protective circuit 58 via the wiring 67. Each of the voltage detection circuits (70A, 70B or the like) is electrically connected in parallel to a plurality of lithium ion batteries (unit cells) forming corresponding one unit of the battery units.

In certain Example, in place of detecting the voltage of each of the battery units, a positive electrode electric potential or a negative electrode electric potential is detected for each of the battery units. In this case, a lithium electrode or the like as a reference electrode is provided in the battery module 52. With reference to an electric potential at the reference electrode, a positive electrode electric potential or a negative electrode electric potential of each of the battery units is detected.

The protective circuit 58 may determine whether or not the battery module 52 satisfies a predetermined condition based on the detection results of the thermistor 57 and the detection results of the voltage detection circuits (70A, 70B or the like). For example, when the detected temperature of the thermistor 57 is equal to or higher than a predetermined temperature, the protective circuit 58 determines that the battery module 52 satisfies a predetermined condition. When any of over-charge, over-discharge, and over-current or the like is detected in the battery module 52, the protective circuit 58 determines that the battery module 52 satisfies a predetermined condition. The over-charge or the like is determined based on the detection results of the voltage detection circuits (70A, 70B or the like), for example. The over-charge or the like may be determined for each of the plurality of lithium ion batteries, or may be determined for the entire battery module 52.

In the battery pack 50, the energizing external terminal 59 is provided. The protective circuit 58 can be connected to the external terminal 59 via a plus wiring 66a and a minus wiring 66b. When the protective circuit 58 determines that the battery module 52 satisfies the above-described predetermined condition, the protective circuit 58 can cut off conduction between the protective circuit 58 and the energizing external terminal 59 in the plus wiring 66a and the minus wiring 66b. By cutting off the conduction between the protective circuit 58 and the energizing external terminal 59, the output of the current from the battery module 52 to the outside and the input of the current to the battery module 52 are stopped. This effectively prevents over-charge and over-discharge or the like from continuously occurring in the battery module 52.

In the present embodiment, each of the battery units (53A, 53B or the like) is formed from one aqueous LIB and one or more nonaqueous LIBs. For example, in the battery unit 53A, one aqueous LIB (A1) and one or more nonaqueous LIBs (A2 to An) are electrically connected in parallel. In the battery unit 53B, one aqueous LIB (B1) and one or more nonaqueous LIBs (B2 to Bn) are electrically connected in parallel. In one example of FIG. 4, the plurality of battery units (53A, 53B or the like) are provided, but the battery module 52 may be formed from only one battery unit.

When the nonaqueous LIB is fully charged, that is, when SOC reaches 100%, energization hardly occurs. For this reason, if the current supply to the nonaqueous LIB is continued on some level after the nonaqueous LIB is fully charged, the voltage of the nonaqueous LIB is largely increased rapidly from the voltage during full-charge, which causes the over-charge of the nonaqueous LIB. On the other hand, even if the aqueous LIB is fully charged, the current is passed by the electrolysis of the aqueous solvent. For this reason, even if the supply of the current to the aqueous LIB is continued after the aqueous LIB is fully charged, the aqueous LIB is float-charged. Therefore, even if the supply of the current to the aqueous LIB is further continued after the aqueous LIB is fully charged, the increase in the voltage of the aqueous LIB from the fully charged state is suppressed. In the float-charge of the aqueous LIB, the aqueous LIB is charged in a state where the aqueous LIB is maintained at the voltage during full-charge.

Here, for each of the battery units (53A, 53B or the like), charge voltage $V\alpha$ corresponding to the electric potential during the full-charge of the aqueous LIB, and charge voltage $V\beta$ corresponding to the electric potential during the full-charge of the nonaqueous LIB are defined. In the present embodiment, in any of the battery units (53A, 53B or the like), the charge voltage $V\alpha$ of the aqueous LIB is preferably −0.1 V or more and +0.2 V or less with respect to the charge voltage $V\beta$ of the nonaqueous LIB connected in parallel. That is, also in any of the battery units (53A, 53B or the like), the relationship of the following formula (1) is preferably completed.

$$(V\beta - 0.1\ V) \le V\alpha \le (V\beta + 0.2\ V) \quad (1)$$

When the charge voltage $V\alpha$ is smaller than the lower limit of the range of the formula (1), that is, when the charge voltage $V\alpha$ is smaller than −0.1 V with respect to the charge voltage $V\beta$, the nonaqueous LIBs (A2 to An or the like) do not satisfy the full-charge in the charge of the battery module 52, but the aqueous LIB (A1 or the like) is float-charged. For this reason, power efficiency in the charge of the battery module 52 may be decreased. On the other hand, when the charge voltage $V\alpha$ is more than the upper limit value of the range of the formula (1), that is, when the charge voltage $V\alpha$ is more than +0.2 V with respect to the charge voltage $V\beta$, the nonaqueous LIB is apt to be over-charged, and the voltage of the nonaqueous LIB may be largely increased rapidly from the charge voltage Vβ. In particular, when the voltage of the nonaqueous LIB exceeds a predetermined threshold value, and the protective circuit 58 or the like does not perform control or the like to cut off the supply of the current to the battery module 52, the voltage of the nonaqueous LIB is apt to be largely increased by over-charge.

As described above, in the battery module 52 of the present embodiment, in each of the battery units (53A, 53B), the aqueous LIB is connected in parallel to the nonaqueous LIB. For example, in the charge or the like of the battery module 52, a non-stationary state may also be caused, where the current is continuously supplied to the battery module 52 after all the lithium ion batteries of the battery module 52 are fully charged. In the present embodiment, even in the above-described non-stationary state, the aqueous LIB passes a current in each of the battery units (53A, 53B or the like). That is, in each of the battery units (53A, 53B or the like), the aqueous LIB is continuously charged (float-charged) in a state where the aqueous LIB is maintained at constant voltage (charge voltage). This prevents the over-charge of the nonaqueous LIB parallelized with respect to the aqueous LIB in each of the battery units (53A, 53B or the like).

Therefore, in the present embodiment, even if some or all of the nonaqueous LIBs are fully charged, the aqueous LIB parallelized to the fully charged nonaqueous LIBs passes a current. This prevents the over-charge of the nonaqueous LIBs, and suppresses an increase in the voltage of the nonaqueous LIBs from the charge voltage (voltage during full-charge).

The battery module 52 in which the plurality of battery units (53A, 53B or the like) are connected in series as in the present embodiment may cause a variation in state of charge (SOC) between the battery units (53A, 53B or the like) in the charge or the like of the battery module 52. Examples of the variation in SOC between the battery units include a case where the lithium ion battery is fully charged (SOC: 100%) in the battery unit 53A and the lithium ion battery does not satisfy the full-charge in the battery unit 53B. As described above, even if all the lithium ion batteries satisfy the full-charge in each of the battery units (53A, 53B or the like), the aqueous LIB passes a current. For this reason, also in the fully charged battery unit 53A, the aqueous LIB (A1) is float-charged, and the aqueous LIB (A1) passes a current. Therefore, even when the battery unit 53A is fully charged, the battery unit 53A continues to energize. The aqueous LIB (A1) passes a current even after the aqueous LIB is fully charged, whereby the over-charge of the nonaqueous LIBs (A2 to An) is prevented in the battery unit 53A, and an increase in the voltage of the nonaqueous LIBs (A2 to An) is suppressed.

The battery unit 53A passes a current even after the battery unit 53A to be fully charged, so that the current is supplied to the battery unit 53B which does not satisfy the full-charge. Therefore, the lithium ion battery of the battery unit 53B is charged, for example, by the constant voltage charge or the like of the battery module 52 at the upper limit electric potential during charge. Thereby, the lithium ion battery of the battery unit 53B is fully charged, and the deviation of SOC between the battery units 53A and 53B is eliminated.

As described above, in the present embodiment, even if a variation in state of charge occurs between the battery units (53A, 53B or the like), the constant voltage charge of the battery module 52 can be provided at the upper limit electric potential during charge, for example. Therefore, even when the lithium ion battery is fully charged only in a certain battery unit, and the lithium ion battery does not satisfy the full-charge in another battery unit, all the battery units are fully charged by continuously charging the battery module 52. Thereby, the deviation of SOC between the battery units is eliminated.

In the present embodiment, as described above, all the battery units are fully charged by charge, and the deviation of SOC between the battery units can be eliminated. For this reason, even if the battery module is repeatedly charged and discharged while being used, a decrease in the actual capacity of the battery module is suppressed, which provides suppressed deterioration in the battery module.

In the present embodiment, the deviation of SOC is eliminated as described above, whereby the configuration or the like of the protective circuit are not complicated. The circuit design of the protective circuit or the like is not complicated, whereby the production cost or the like of the battery module can be suppressed in the present embodiment. For example, when a variation occurs in SOC between the battery units in a configuration in which the aqueous LIB is not provided in the battery module, it is necessary to store electric power to a capacitor or the like through the protective circuit without supplying a current to the battery unit which satisfies the full-charge. It is necessary to reallocate the stored electric power. The provision of these configurations in the protective circuit or the like causes complicated circuit design.

In the present embodiment, the charge voltage Vα of the aqueous LIB is −0.1 V or more and +0.2 V or less with respect to the charge voltage Vβ of the nonaqueous LIB connected in parallel. That is, in the aqueous LIB, an operating electric potential such as charge voltage is the same or substantially the same as that in the nonaqueous LIB connected in parallel. Therefore, the aqueous LIB has voltage compatibility with respect to the nonaqueous LIB connected in parallel. For this reason, in the battery module, the number of the nonaqueous LIBs and the number of the aqueous LIBs in the parallel section of the nonaqueous LIBs and the aqueous LIBs may not be adjusted. That is, securement of voltage compatibility in each of the battery units may not be adjusted.

In the battery module of the present embodiment, only the aqueous LIB and the nonaqueous LIB are used, and an aqueous lead storage battery and an aqueous Ni-MH battery or the like are not used. This effectively prevents deterioration in the battery module caused by the over-discharge of the aqueous lead storage battery, and deterioration in the battery module caused by a memory effect of the aqueous Ni-MH battery, or the like.

As described above, the lithium ion battery has a high energy density, and the aqueous LIB has high safety. This makes it possible to provide the battery module having a high energy density and high safety.

(Applications of Battery Module and Battery Pack)

The configuration or the like of the battery module of the present embodiment is appropriately changed depending on the application. The application of the battery module is preferably an apparatus or the like which is required to be charged and discharged with a large current. Specific examples of the application of the battery module include electric power supplies for digital cameras, vehicle-installed batteries, and stationary batteries. In this case, examples of the vehicle on which the battery module is mounted include two- or four-wheel hybrid electric automobiles, two- or four-wheel electric automobiles, assisted bicycles, and railway vehicles. In particular, the battery module of the present embodiment is suitable for vehicle-installed batteries.

As described above, the battery module of the present embodiment has a high energy density and high safety. For this reason, the battery module of the present embodiment is suitably used for a starter power source for a vehicle as an alternative power source for a lead battery, and also suitable as a vehicle-installed secondary battery to be installed on a hybrid vehicle, and a stationary storage battery.

<Usage Example to Vehicle>

Figure 5:
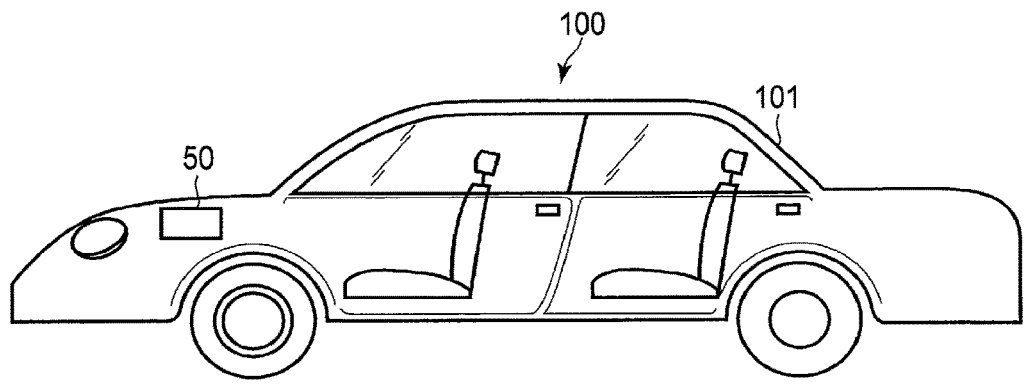
FIG. 5 is a schematic diagram showing an application example of the battery pack according to the first embodiment to a vehicle as a first usage example.

FIG. 5 is a diagram showing an application example to a vehicle 100 as a first usage example of a battery module and a battery pack 50 according to the present embodiment. In one example shown in FIG. 5, the vehicle 100 includes a vehicle body 101 and a battery pack 50. In one example shown in FIG. 5, the vehicle 100 is a four-wheeled automobile. The vehicle 100 may include a plurality of battery packs 50 mounted thereon.

In one example of FIG. 5, the battery pack 50 is mounted in an engine room located in a front part of the vehicle body 101. The battery pack 50 may be mounted, for example, a behind part of the vehicle body 101 or below a seat. As described above, the battery pack 50 can be used as an electric power supply for the vehicle 100. The battery pack 50 can recover the regenerative energy of the mechanical power of the vehicle 100.

<Usage Example as Stationary Power Supply>

Figure 6:
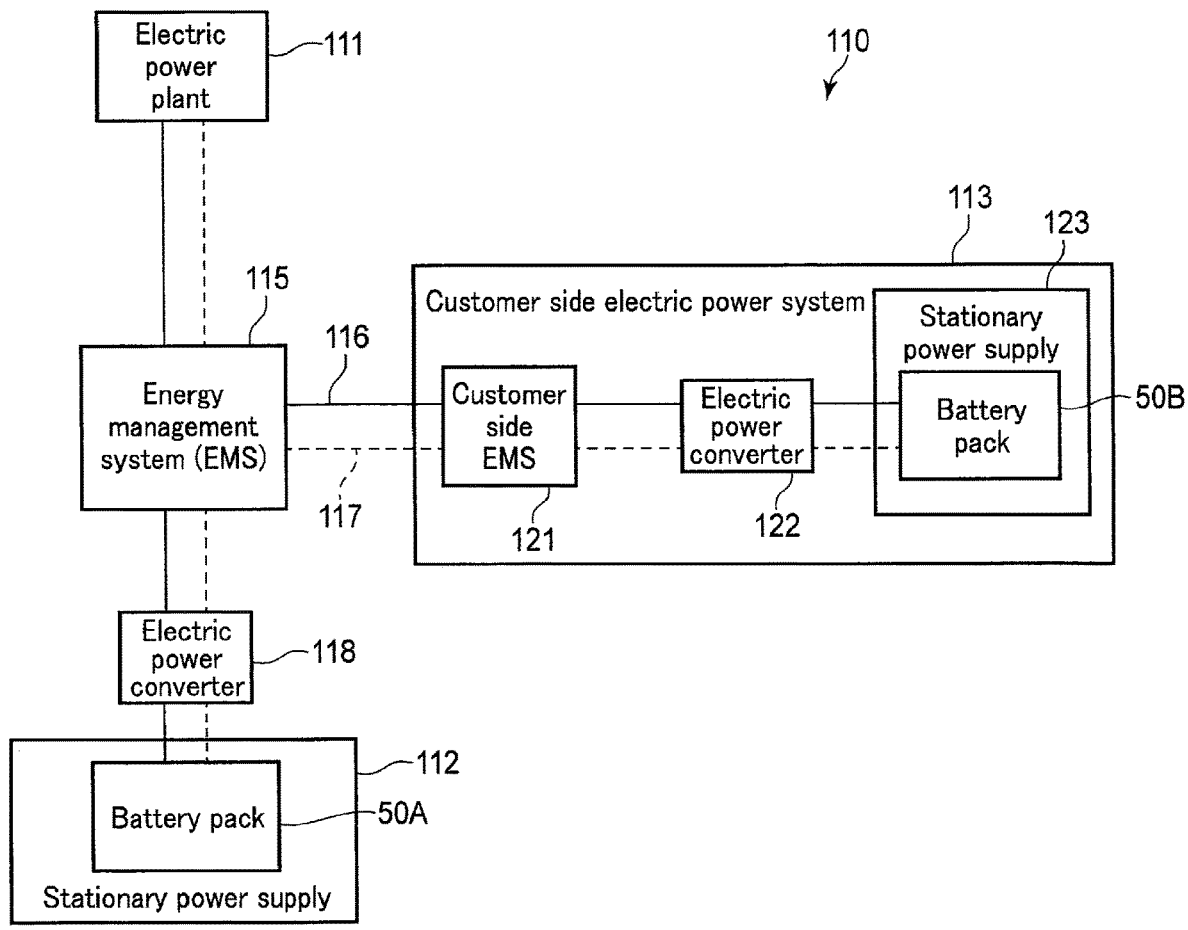
FIG. 6 is a schematic diagram showing an application example of the battery pack according to the first embodiment to a stationary power supply as a second usage example.

FIG. 6 is a diagram showing an application example to stationary power supplies 112, 123 as a second usage example of a battery module and battery packs 50A, 50B of the present embodiment. In one example shown in FIG. 6, a system 110 is shown, which uses the stationary power supplies 112, 123. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 50A is installed in the stationary power supply 112. The battery pack 50A can store electric power and the like supplied from the electric power plant 111. In addition, the stationary power supply 112 can supply the electric power stored in the battery pack 50A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 50A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 50B is installed in the stationary power supply 123. The customer side EMS 121 performs control to stabilize the customer side electric power system 113.

Electric power from the electric power plant 111 and electric power from the battery pack 50A are supplied to the customer side electric power system 113 through the electric power network 116. The battery pack 50B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 50B.

Note that the electric power stored in the battery pack 50B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

(Verifications on Embodiments)

Verifications on the above-described embodiments were performed. The performed verifications will be described below. In the verifications, battery modules of Examples 1 to 6 and Comparative Examples 1 to 6 below were produced. For the battery modules of Examples 1 to 6 and Comparative Examples 1 to 6, the following tests on charge and discharge were performed. The test conditions and test results of Examples 1 to 6 and Comparative Examples 1 to 6 will be described below with reference to Tables 1 and 2. Here, Table 1 shows the test conditions of Examples 1 to 6 and Comparative Examples 1 to 6, and Table 2 shows the test results of Examples 1 to 6 and Comparative Examples 1 to 6.

TABLE 1

|  | Positive electrode active material | Negative electrode active material | Series number of battery units | Connection in battery unit |
|---|---|---|---|---|
| Example 1 | $LiMn_2O_4$ | $Li_4Ti_5O_{12}$ | 1 | 2 parallel (aqueous LIB + nonaqueous LIB) |
| Example 2 | $LiMn_2O_4$ | $Li_4Ti_5O_{12}$ | 2 | 2 parallel (aqueous LIB + nonaqueous LIB) |

TABLE 1-continued

| | Positive electrode active material | Negative electrode active material | Series number of battery units | Connection in battery unit |
|---|---|---|---|---|
| Example 3 | $LiMn_2O_4$ | $Li_4Ti_5O_{12}$ | 2 | 3 parallel (aqueous LIB + nonaqueous LIB × 2) |
| Example 4 | $LiMn_2O_4$ | $Li_4Ti_5O_{12}$ | 3 | 3 parallel (aqueous LIB + nonaqueous LIB × 2) |
| Example 5 | $LiMn_2O_4$ | $Nb_2TiO_7$ | 2 | 2 parallel (aqueous LIB + nonaqueous LIB) |
| Example 6 | $LiNi_{0.33}Co_{0.33}Mn_{0.33}O_2$ | $Li_4Ti_5O_{12}$ | 2 | 2 parallel (aqueous LIB + nonaqueous LIB) |
| Comparative Example 1 | $LiMn_2O_4$ | $Li_4Ti_5O_{12}$ | 1 | 2 parallel (nonaqueous LIB × 2) |
| Comparative Example 2 | $LiMn_2O_4$ | $Li_4Ti_5O_{12}$ | 2 | 2 parallel (nonaqueous LIB × 2) |
| Comparative Example 3 | $LiMn_2O_4$ | $Li_4Ti_5O_{12}$ | 2 | 3 parallel (nonaqueous LIB × 3) |
| Comparative Example 4 | $LiMn_2O_4$ | $Li_4Ti_5O_{12}$ | 3 | 3 parallel (nonaqueous LIB × 3) |
| Comparative Example 5 | $LiMn_2O_4$ | $Nb_2TiO_7$ | 2 | 2 parallel (nonaqueous LIB × 2) |
| Comparative Example 6 | $LiNi_{0.33}Co_{0.33}Mn_{0.33}O_2$ | $Li_4Ti_5O_{12}$ | 2 | 2 parallel (nonaqueous LIB × 2) |

TABLE 2

| | Voltage (V) at SOC: 120% | Maintenance rate (%) at 500th cycle | Residual capacity (%) of aqueous LIB | Current value (C) of aqueous LIB during charge for 24 h |
|---|---|---|---|---|
| Example 1 | 3.0 | 99 | 91 | 0.1 |
| Example 2 | 5.9 | 98 | 91 | 0.1 |
| Example 3 | 6.0 | 94 | 91 | 0.1 |
| Example 4 | 8.8 | 92 | 91 | 0.1 |
| Example 5 | 6.1 | 89 | 88 | 0.13 |
| Example 6 | 5.8 | 88 | 90 | 0.11 |
| Comparative Example 1 | 5.0 | 97 | — | — |
| Comparative Example 2 | 9.8 | 84 | — | — |
| Comparative Example 3 | 9.7 | 82 | — | — |
| Comparative Example 4 | 14.8 | 80 | — | — |
| Comparative Example 5 | 10.3 | 81 | — | — |
| Comparative Example 6 | 11.2 | 81 | — | — |

EXAMPLE 1

In Example 1, a battery module was formed from one nonaqueous LIB and one aqueous LIB. In the battery module, a lithium ion battery (unit cell) having a capacity of 10 mAh was used for each of the aqueous LIB and the nonaqueous LIB. Each of the aqueous LIB and the nonaqueous LIB was produced as follows.

In the aqueous LIB, a positive electrode was produced as follows. That is, in the aqueous LIB, 100 parts by weight of $LiMn_2O_4$ powder was used as a positive electrode active material, and 10 parts by weight of acetylene black was used as a conductive agent. 10 parts by weight of polyvinylidene fluoride (PVdF) was prepared as a binder. The positive electrode active material, the conductive agent, and the binder were added to N-methyl pyrrolidone (NMP), followed by mixing to prepare a slurry. The prepared slurry was applied to each of both surfaces of a current collector (positive electrode current collector). A titanium foil having a thickness of 15 μm was used as the current collector. A coating film of the slurry was dried, and the current collector and the coating film were then pressed to produce a positive electrode sheet. The positive electrode sheet was produced, which had an electrode density of 2.5 g/cm³. The produced positive electrode sheet was punched out. Thereby, a positive electrode was formed, which included a tab portion (current collecting portion) of 20 mm×40 mm and an electrode portion of 40 mm×40 mm.

In the aqueous LIB, a negative electrode was produced as follows. That is, in the aqueous LIB, 100 parts by weight of $Li_4Ti_5O_{12}$ powder was used as a negative electrode active material, and 10 parts by weight of acetylene black was used as a conductive agent. 10 parts by weight of PTFE was used as a binder. The negative electrode active material, the conductive agent, and the binder were added to NMP, followed by mixing to prepare a slurry. The prepared slurry was applied to each of both surfaces of a current collector (negative electrode current collector). As the current collector, a zinc foil was used, which had a carbon-containing coating layer having a layer thickness of 1 μm, and the zinc foil had a thickness of 15 μm. The coating film of the slurry was dried, and the current collector and the coating film were then pressed to produce a negative electrode sheet. The negative electrode sheet was produced, which had an electrode density of 2.0 g/cm$^3$. The produced negative electrode sheet was punched out. Thereby, a negative electrode was formed, which included a tab portion (current collecting portion) of 20 mm×40 mm and an electrode portion of 40 mm×40 mm.

The positive electrode and the negative electrode produced as described above were alternately stacked to produce a stack body as an electrode group. In the stack body, a separator was interposed between the positive electrode and the negative electrode. The separator prevented the positive electrode and the negative electrode from being in direct contact with each other. For the separator, a LATP plate with a thickness of 150 μm was used to prevent a short circuit between the positive electrode and the negative electrode via a liquid such as an electrolytic solution. In each of the positive electrode and the negative electrode, a terminal was ultrasonically welded to the tab portion (current collecting portion). A terminal was used, which was made of aluminum and had an anodized surface. Furthermore, the stack body (electrode group) was stored in a pack made of a laminated film. At this time, the stack body was sandwiched by a glass filter, which was likely to cause the stack body (electrode group) to be impregnated with the electrolytic solution. As the glass filter, a filter was used, which had the same shape as that of the electrode and had a thickness of 1 mm. As the laminated film, a film was used, which was obtained by forming a polypropylene layer on each of both surfaces of an aluminum foil having a thickness of 40 μm. The thickness of the laminated film was 0.1 mm.

The electrolytic solution was dropped into the produced electrode group. At this time, an aqueous solution in which 12-M LiCl was dissolved was dropped into the positive electrode side, and an aqueous solution in which 12-M LiCl and 1-M LiOH were dissolved was dropped into the negative electrode side. 2 ml of the electrolytic solution was dropped into each of the positive electrode side and the negative electrode side. The electrolytic solution was injected, and the pack of the laminated film was then completely heat-sealed. Thereby, a laminate cell type aqueous LIB was produced.

The stack body (electrode group) of the nonaqueous LIB was produced in the same manner as in the stack body of the aqueous LIB except that a PE separator having a thickness of 10 μm was used as the separator. In the nonaqueous LIB, an electrolytic solution was used, which was obtained by dissolving 1.2-M LiPF$_6$ in a solvent. In this case, a mixed solvent prepared by mixing propylene carbonate (PC) and diethyl carbonate (DEC) at a volume ratio of 1:1 was used as a solvent. The electrolytic solution was injected, and the pack of the laminated film was then completely heat-sealed. Thereby, a laminate cell type nonaqueous LIB was produced. In the production of the nonaqueous LIB, all steps after the electrolytic solution was injected were performed under an Ar atmosphere.

In the present Example, an aqueous LIB having a capacity of 10 mAh and a nonaqueous LIB having a capacity of 10 mAh were produced as described above. One aqueous LIB and one nonaqueous LIB were connected in parallel to produce a battery unit. In the present example, one battery unit produced as described above was used as the battery module. In the battery module produced as described above, 1 C was 20 mA.

In the test, the produced battery module was charged at a current value of 1 C without setting the upper limit value of a charge electric potential. The voltage of the battery module was measured when the battery module was charged up to 120% of the capacity, that is, when SOC satisfied 120%. When the battery module is charged at 1 C without setting the upper limit value of the charge electric potential, the battery module is continuously charged for 1.2 h from a state where SOC is 0%, to satisfy SOC of 120%. In the present Example, the voltage of the battery module when SOC was 120% was 3.0 V.

In the test, the following charge-and-discharge cycle test was performed for the produced battery module. The cycle test was performed at 25° C. with the charge electric potential set at 2.7 V and the discharge electric potential set at 1.3 V. In the charge of the battery module, constant-current charge was performed at a current value of 1 C (20 mA in the present Example) until the voltage satisfied the charge electric potential. After 1.1 h (1.1 hours) from the start of charge, or after the voltage of the battery module satisfied the charge electric potential (2.7 V in the present Example), one charge was ended based on the convergence of a current value to 0.5 C (10 mA in the present Example) or less. When the voltage of the battery module satisfied the charge electric potential before the end of the one charge, constant voltage charge at the charge electric potential was performed after the voltage satisfied the charge electric potential.

In the discharge of the battery module, constant current discharge was performed at a current value of 1 C until the voltage satisfied the discharge electric potential. One charge was ended based on that the voltage of the battery module satisfied the discharge electric potential. No pause time was provided between the end of the charge and the start of the discharge, and between the end of the discharge and the start of the charge. In the charge-and-discharge cycle test of the battery module, charge and discharge (1 cycle) were performed in 500 cycles. The capacity retention ratio of the battery module at 500th cycle was calculated. In the present Example, the capacity retention ratio at 500th cycle was 99%. The capacity retention ratio at 500th cycle is the ratio (represented by percentage) of the discharge capacity at 500th cycle to the discharge capacity at first cycle.

In the present Example, a charge-and-discharge cycle test was also performed for the single aqueous LIB used for the battery module. The charge-and-discharge cycle test was performed at 25° C. with the charge electric potential set at 2.7 V and the discharge electric potential set at 1.3 V. Charge to the charge electric potential and discharge to the discharge electric potential were performed at a current value of 10 mA (corresponding to 1 C of the aqueous LIB). After 1.1 h from the start of the charge or after the voltage of the aqueous LIB reached the charge electric potential, one charge was ended based on the convergence of the current value to 5 mA (corresponding to 0.5 C of the aqueous LIB) or less. One discharge was ended based on the voltage of the aqueous LIB reaching the discharge electric potential.

In the charge-and-discharge cycle test of the aqueous LIB, no pause time was provided between the end of the charge and the start of the discharge, and between the end of the discharge and the start of the charge. Charge and discharge (1 cycle) were performed in 100 cycles. After the charge and discharge of 100th cycle, the aqueous LIB was fully charged (SOC: 100%), and a storage test was performed at 25° C. In the storage test, the self-discharge rate of the aqueous LIB per day under the above-described storage environment was measured. In the present Example, the residual capacity of the aqueous LIB after being stored for 1 day as described above was 91%.

In the present Example, the single aqueous LIB used for the battery module was continuously charged for 24 hours. In the charge, constant-current charge was performed at a current value of 1 C (10 mA in this case) until the voltage of the aqueous LIB reached the charge electric potential (2.7 V in this case). After the voltage of the aqueous LIB reached the charge electric potential, constant voltage charge was performed at the charge electric potential. The value of a current flowing in the aqueous LIB when being continuously charged for 24 hours from the start of the charge was measured. In the present Example, also when the aqueous LIB was continuously charged for 24 hours, a current of 1 mA (equivalent to 0.1 C of the aqueous LIB) was observed in the aqueous LIB.

EXAMPLE 2

In Example 2, two battery units described in Example 1 were produced. The two battery units were connected in series to produce a battery module. Also in the present Example, one aqueous LIB and one nonaqueous LIB were connected in parallel in each of the battery units.

Also in the present Example, as with Example 1, the voltage of the battery module when SOC was 120% was measured, and the voltage of the battery module was 5.9 V. Also in the present Example, 1 C of the battery module was 20 mA. Here, in Examples 1 to 6 and Comparative Examples 1 to 6, 1 C of the battery module was a value corresponding to the number of lithium ion batteries connected in parallel in one battery unit. 1 C of the battery module was a value obtained by multiplying the number of lithium ion batteries forming one battery unit by 10 mA.

Also in Example 2, a charge-and-discharge cycle test of 500 cycles was performed for the battery module in the same manner as in Example 1. The capacity retention ratio of the battery module at 500th cycle was calculated. However, in the present Example, in the charge-and-discharge cycle test, a charge electric potential was 5.4 V and a discharge electric potential was 2.6 V. In the present Example, a capacity retention ratio at 500th cycle was 98%. Here, in Examples 1 to 6 and Comparative Examples 1 to 6, the charge electric potential and the discharge electric potential in the charge-and-discharge cycle test of the battery module were determined based on the series number of the battery units connected in series. The charge electric potential was determined to be a value obtained by multiplying the series number of the battery units by 2.7 V. The discharge electric potential was determined to be a value obtained by multiplying the series number of the battery units by 1.3 V.

In the present Example, the single aqueous LIB used for the battery module is the same as that in Example 1. For this reason, the same results as those in Example 1 were obtained in the test for the single aqueous LIB.

EXAMPLE 3

In Example 3, two battery units were connected in series to produce a battery module. In Example 3, unlike Examples 1 and 2, one aqueous LIB and two nonaqueous LIBs were connected in parallel in each of the battery units. For this reason, 1 C of the battery module of the present Example was 30 mA. In the present Example, the aqueous LIB and the nonaqueous LIB were produced in the same manner as in Examples 1 and 2.

Also in the present Example, as with Examples 1 and 2, the voltage of the battery module when SOC was 120% was measured, and the voltage of the battery module was 6.0 V. Also in Example 3, as with Examples 1 and 2, a charge-and-discharge cycle test of 500 cycles was performed for the battery module, and the capacity retention ratio of the battery module at 500th cycle was calculated. In the present Example, in the charge-and-discharge cycle test, a charge electric potential was 5.4 V and a discharge electric potential was 2.6 V. In the present Example, the capacity retention ratio at 500th cycle was 94%.

In the present Example, the single aqueous LIB used for the battery module is the same as that in each of Examples 1 and 2. For this reason, the same results as those in Examples 1 and 2 were obtained in the test for the single aqueous LIB.

EXAMPLE 4

Also in Example 4, as with Example 3, one aqueous LIB and two nonaqueous LIBs were connected in parallel in each of battery units. However, in the present Example, unlike Examples 1 to 3, three battery units were connected in series to produce a battery module. As in Example 3, 1 C of the battery module of the present Example was 30 mA. In the present Example, the aqueous LIB and the nonaqueous LIB were produced in the same manner as in. Examples 1 to 3.

Also in the present Example, as with Examples 1 to 3, the voltage of the battery module when SOC was 120% was measured, and the voltage of the battery module was 8.8 V. Also in Example 4, as with Examples 1 to 3, a charge-and-discharge cycle test of 500 cycles was performed for the battery module, and the capacity retention ratio of the battery module at 500th cycle was calculated. In the present Example, in the charge-and-discharge cycle test, a charge electric potential was 8.1 V and a discharge electric potential was 3.9 V. In the present Example, the capacity retention ratio at 500th cycle was 92%.

In the present Example, the single aqueous LIB used for the battery module is the same as that in each of Examples 1 to 3. For this reason, the same results as those of Examples 1 to 3 were obtained in the test for the single aqueous LIB.

EXAMPLE 5

In Example 5, unlike Examples 1 to 4, $Nb_2TiO_7$ was used in place of $Li_4Ti_5O_{12}$ as a negative electrode active material in each of an aqueous LIB and a nonaqueous LIB. Regarding other configurations or the like, a battery module was produced in the same manner as in Example 2, including the series number of battery units and the configuration of each of the battery units.

Also in the present Example, as with Example 2, the voltage of the battery module when SOC was 120% was measured, and the voltage of the battery module was 6.1 V. Also in Example 5, as with Example 2, a charge-and-discharge cycle test of 500 cycles was performed for the battery module, and the capacity retention ratio of the battery module at 500th cycle was calculated. In the present Example, the capacity retention ratio at 500th cycle was 89%.

Also in Example 5, a test was performed for the single aqueous LIB in the same manner as in Examples 1 to 4. That is, also in the present Example, as with Examples 1 to 4, a storage test was performed for the fully charged aqueous LIB at 25° C. after the charge-and-discharge cycle test of 100 cycles. In the present example, the residual capacity of the aqueous LIB after being stored for 1 day as described above was 89%. Also in the present Example, as with Examples 1 to 4, the value of a current flowing in the aqueous LIB when being continuously charged for 24 hours from the start of the charge was measured. In the present Example, even when the aqueous LIB was continuously charged for 24 hours, a current of 0.13 C was observed in the aqueous LIB.

EXAMPLE 6

In Example 6, unlike Examples 1 to 5, in each of an aqueous LIB and a nonaqueous LIB, $LiNi_{0.33}Co_{0.33}Mn_{0.33}O_2$ contained in $LiNi_xCo_yMn_{1-x-y}O_2$ ($0 \leq x, Y \leq 1$) was used in place of $LiMn_2O_4$ as a positive electrode active material. Regarding other configurations or the like, a battery module was produced in the same manner as in Example 2, including a negative electrode active material to be used, the series number of battery units, and the respective configurations of the battery units.

Also In the present Example, as with Example 2, the voltage of the battery module when SOC was 120% was measured, and the voltage of the battery module was 5.8 V. Also in Example 6, as with Example 2, a charge-and-discharge cycle test of 500 cycles was performed for the battery module, and the capacity retention ratio of the battery module at 500th cycle was calculated. In the present Example, the capacity retention ratio at 500th cycle was 88%.

Also in Example 6, a test was performed for the single aqueous LIB in the same manner as in Examples 1 to 5. That is, also in the present Example, as with Examples 1 to 5, a storage test was performed for the fully charged aqueous LIB at 25° C. after the charge-and-discharge cycle test of 100 cycles. In the present example, the residual capacity of the aqueous LIB after being stored for 1 day as described above was 90%. Also in the present Example, as with Examples 1 to 5, the value of a current flowing in the aqueous LIB when being continuously charged for 24 hours from the start of the charge was measured. In the present Example, even when the aqueous LIB was continuously charged for 24 hours, a current of 0.11 C was observed in the aqueous LIB.

COMPARATIVE EXAMPLE 1

In Comparative Example 1, a nonaqueous LIB was used in place of an aqueous LIB in a battery unit, and two nonaqueous LIBs were connected in parallel. Regarding other configurations or the like, a battery module was produced in the same manner as in Example 1.

Also in the present Comparative Example, as with Example 1, the voltage of the battery module when SOC was 120% was measured, and the voltage of the battery module was 5.0 V. Also in Comparative Example 1, as with Example 1, a charge-and-discharge cycle test of 500 cycles was performed for the battery module, and the capacity retention ratio of the battery module at 500th cycle was calculated. In the present Comparative Example, the capacity retention ratio at 500th cycle was 97%.

COMPARATIVE EXAMPLE 2

In Comparative Example 2, in each of battery units, a nonaqueous LIB was used in place of an aqueous LIB, and two nonaqueous LIBs were connected in parallel. Regarding other configurations or the like, a battery module was produced in the same manner as in Example 2.

Also in this Comparative Example, as with Example 2, the voltage of the battery module when SOC was 120% was measured, and the voltage of the battery module was 9.8 V. Also in Comparative Example 2, as with Example 2, a charge-and-discharge cycle test of 500 cycles was performed for the battery module, and the capacity retention ratio of the battery module at 500th cycle was calculated. In the present Comparative Example, the capacity retention ratio at 500th cycle was 84%.

COMPARATIVE EXAMPLE 3

In Comparative Example 3, in each of battery units, a nonaqueous LIB was used in place of an aqueous LIB, and three nonaqueous LIBs were connected in parallel. Regarding other configurations or the like, a battery module was produced in the same manner as in Example 3.

Also in the present Comparative Example, as with Example 3, the voltage of the battery module when SOC was 120% was measured, and the voltage of the battery module was 9.7 V. Also in Comparative Example 3, as with Example 3, a charge-and-discharge cycle test of 500 cycles was performed for the battery module, and the capacity retention ratio of the battery module at 500th cycle was calculated. In the present Comparative Example, the capacity retention ratio at 500th cycle was 82%.

COMPARATIVE EXAMPLE 4

In Comparative Example 4, in each of battery units, a nonaqueous LIB was used in place of an aqueous LIB, and three nonaqueous LIBs were connected in parallel. Regarding other configurations or the like, a battery module was produced in the same manner as in Example 4.

Also in the present Comparative Example, as with Example 4, the voltage of the battery module when SOC was 120% was measured, and the voltage of the battery module was 14.8 V. Also in Comparative Example 4, as with Example 4, a charge-and-discharge cycle test of 500 cycles was performed for the battery module, and the capacity retention ratio of the battery module at 500th cycle was calculated. In the present Comparative Example, the capacity retention ratio at 500th cycle was 80%.

COMPARATIVE EXAMPLE 5

In Comparative Example 5, in each of battery units, a nonaqueous LIB was used in place of an aqueous LIB, and two nonaqueous LIBs were connected in parallel. Regarding other configurations or the like, a battery module was produced in the same manner as in Example 5.

Also in the present Comparative Example, as with Example 5, the voltage of the battery module when SOC was 120% was measured, and the voltage of the battery module was 10.3 V. Also in Comparative Example 5, as with Example 5, a charge-and-discharge cycle test of 500 cycles was performed for the battery module, and the capacity retention ratio of the battery module at 500th cycle was calculated. In the present comparative example, the capacity retention ratio at 500th cycle was 81%.

COMPARATIVE EXAMPLE 6

In Comparative Example 6, in each of battery units, a nonaqueous LIB was used in place of an aqueous LIB, and two nonaqueous LIBs were connected in parallel. Regarding other configurations or the like, a battery module was produced in the same manner as in Example 6.

Also in the present Comparative Example, as with Example 6, the voltage of the battery module when SOC was 120% was measured, and the voltage of the battery module was 11.2 V. Also in Comparative Example 6, as with Example 6, a charge-and-discharge cycle test of 500 cycles was performed for the battery module, and the capacity retention ratio of the battery module at 500th cycle was calculated. In the present comparative example, the capacity retention ratio at 500th cycle was 81%.

<Considerations for Test Results>

In the above-described tests, the voltage of the battery module when SOC was 120% in each of Examples 1 to 6 was lower than that in the corresponding one of Comparative Examples 1 to 6. Therefore, it was proved that the over-charge of the nonaqueous LIB parallelized to the aqueous LIB is suppressed by connecting the nonaqueous LIB and the aqueous LIB in parallel in each of the battery units.

The capacity retention ratio of the battery module at 500th cycle in the charge-and-discharge cycle test in each of Examples 1 to 6 was higher than that in the corresponding one of Comparative Examples 1 to 6. Therefore, it was proved that the reduction in the actual capacity of the battery module is suppressed by connecting the nonaqueous LIB and the aqueous LIB in parallel in each of the battery units. Thereby, in the battery module of the present embodiment, it was proved that the deviation of SOC between the battery units during charge is eliminated, which provides suppressed deterioration in the battery module.

In Examples 1 to 6, even if the single aqueous LIB was stored for 1 day as described above after the charge-and-discharge test of 100 cycles as described above, the residual capacity of the aqueous LIB was highly maintained. Therefore, it was proved that the aqueous LIB used in the battery module of the present embodiment can be used for a long time.

In Examples 1 to 6, even if the single aqueous LIB was continuously charged for 24 hours from the start of the charge, a certain amount of current flowed in the aqueous LIB. Therefore, it was proved that the aqueous LIB used in the battery module of the present embodiment is energized even after the aqueous LIB is fully charged.

[Common Configuration of Embodiment or the Like]

According to the battery module of at least one embodiment or Example described above, in the battery unit, the aqueous lithium ion battery is connected in parallel to the nonaqueous lithium ion battery. This makes it possible to provide a battery module, a battery pack, a vehicle, and a stationary power supply which achieve suppressed overcharge of the nonaqueous LIB, an energy density highly maintained, and a long operating life without complicating the protective circuit and without performing adjustment for securing voltage compatibility in a parallel section.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A battery module, comprising:
a first battery unit comprising:
a first nonaqueous lithium ion battery including a nonaqueous electrolyte; and
a first aqueous lithium ion battery comprising an electrolytic solution, the electrolytic solution comprising an aqueous solvent and an electrolyte dissolved in the aqueous solvent, the first aqueous lithium ion battery being connected in parallel to the first nonaqueous lithium ion battery,
wherein a voltage of the first aqueous lithium ion battery at a fully charged state is in a range of from −0.1 to +0.2 V with respect to a voltage of the first nonaqueous lithium ion battery at a fully charged state.

2. The module of claim 1, wherein the voltage of the first aqueous lithium ion battery at the fully-charged state is the same as the voltage of the first nonaqueous lithium ion battery at the fully-charged state.

3. The module of claim 1, wherein a material contained in a positive electrode active material in the first nonaqueous lithium ion battery comprises the same as a material contained in a positive electrode active material in the first aqueous lithium ion battery, and
wherein a material contained in a negative electrode active material in the first nonaqueous lithium ion battery comprises the same as a material contained in a negative electrode active material in the first aqueous lithium ion battery.

4. The module of claim 3, wherein each of the first aqueous lithium ion battery and the first nonaqueous lithium ion battery comprises, as the negative electrode active material, a titanium composite oxide, and
wherein the titanium composite oxide comprises a titanium oxide, a lithium titanium oxide having a spinel type structure, a niobium titanium composite oxide, and/or an orthorhombic Na-containing niobium titanium composite oxide.

5. The module of claim 3, wherein each of the first aqueous lithium ion battery and the first nonaqueous lithium ion battery comprises, as the positive electrode active material, a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, and/or a phosphate compound having an olivine crystal structure.

6. The module of claim 1, wherein, in the electrolytic solution of the first aqueous lithium ion battery, an amount of water is 6 times or less in terms of a molar ratio with respect to the electrolyte.

7. The module of claim 1, wherein the electrolytic solution of the first aqueous lithium ion battery has a pH in a range of from 4 to 13.

8. The module of claim 1, further comprising:
a second battery unit connected in series to the first battery unit,
wherein the second battery unit comprises:
a second nonaqueous lithium ion battery comprising a nonaqueous electrolyte; and
a second aqueous lithium ion battery comprising an electrolytic solution, the electrolytic solution comprising an aqueous solvent and an electrolyte dissolved in the aqueous solvent, the second aqueous lithium ion battery being connected in parallel to the second nonaqueous lithium ion battery.

9. A battery pack, comprising the module of claim 1.

10. The pack of claim 9, further comprising:
an external terminal electrically connected to the module; and
a protective circuit.

11. A vehicle, comprising the pack of claim 9.

12. A stationary power supply, comprising the pack of claim 9.

13. The module of claim 1, wherein each of the first aqueous lithium ion battery and the first nonaqueous lithium ion battery comprises, as the positive electrode active material, a lithium manganese composite oxide.

14. The module of claim 1, wherein each of the first aqueous lithium ion battery and the first nonaqueous lithium ion battery comprises, as the positive electrode active material, a lithium nickel composite oxide.

15. The module of claim 1, wherein each of the first aqueous lithium ion battery and the first nonaqueous lithium ion battery comprises, as the positive electrode active material, a lithium cobalt aluminum composite oxide.

16. The module of claim 1, wherein each of the first aqueous lithium ion battery and the first nonaqueous lithium ion battery comprises, as the positive electrode active material, a lithium nickel cobalt manganese composite oxide.

17. The module of claim 1, wherein each of the first aqueous lithium ion battery and the first nonaqueous lithium ion battery comprises, as the positive electrode active material, a spinel type lithium manganese nickel composite oxide.

18. The module of claim 1, wherein each of the first aqueous lithium ion battery and the first nonaqueous lithium ion battery comprises, as the positive electrode active material, a lithium manganese cobalt composite oxide.

19. The module of claim 1, wherein each of the first aqueous lithium ion battery and the first nonaqueous lithium ion battery comprises, as the positive electrode active material, a lithium iron oxide.

20. The module of claim 1, wherein each of the first aqueous lithium ion battery and the first nonaqueous lithium ion battery comprises, as the positive electrode active material, a lithium fluorinated iron sulfate.

* * * * *